(12) United States Patent
Ahn et al.

(10) Patent No.: US 8,860,719 B2
(45) Date of Patent: Oct. 14, 2014

(54) APPARATUS AND METHOD FOR ENCODING THREE-DIMENSIONAL (3D) MESH, AND APPARATUS AND METHOD FOR DECODING 3D MESH

(75) Inventors: Min Su Ahn, Seoul (KR); Do Kyoon Kim, Seongnam-si (KR); Tae Hyun Rhee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 341 days.

(21) Appl. No.: 13/354,918

(22) Filed: Jan. 20, 2012

(65) Prior Publication Data

US 2012/0188241 A1  Jul. 26, 2012

Related U.S. Application Data

(60) Provisional application No. 61/434,905, filed on Jan. 21, 2011.

(30) Foreign Application Priority Data

May 26, 2011 (KR) .................. 10-2011-0050131

(51) Int. Cl.
*G06T 17/00* (2006.01)
*G06T 9/00* (2006.01)

(52) U.S. Cl.
CPC .................................... *G06T 9/001* (2013.01)
USPC .......................................... 345/420; 345/423

(58) Field of Classification Search
CPC ...... G06T 17/20; G06T 9/001; G06T 2210/36
USPC .......................... 345/420, 423, 428
See application file for complete search history.

(56) References Cited

U.S. PATENT DOCUMENTS

| 6,009,435 | A | * | 12/1999 | Taubin et al. | ............... 345/555 |
| 7,538,764 | B2 | | 5/2009 | Salomie | |
| 2004/0017368 | A1 | * | 1/2004 | Isenburg | ....................... 345/419 |
| 2006/0290695 | A1 | * | 12/2006 | Salomie | ....................... 345/420 |

FOREIGN PATENT DOCUMENTS

| KR | 10-2000-0016837 | 3/2000 |
| KR | 10-2000-0028583 | 5/2000 |
| KR | 10-2003-0073100 | 9/2003 |
| KR | 10-2006-0087647 | 8/2006 |
| KR | 10-2006-0087662 | 8/2006 |
| KR | 10-2006-0088136 | 8/2006 |
| KR | 10-2010-0112848 | 10/2010 |

OTHER PUBLICATIONS

Ariel Shamir et al., "Temporal and spatial level of details for dynamic meshes", VRST '01, Nov. 15-17, 2001, Banff, Alberta, Canada, Copyright 2001, Association for Computing Machinery, 8 pages.

* cited by examiner

*Primary Examiner* — Maurice L McDowell, Jr.
(74) *Attorney, Agent, or Firm* — Staas & Halsey LLP

(57) ABSTRACT

An apparatus and method for encoding a 3D mesh, and an apparatus and method for decoding the 3D mesh are disclosed. The 3D mesh encoding apparatus may determine mesh information including position information of each of vertices constituting the 3D mesh, and connectivity information among the vertices, based on a level, and may progressively encode the determined mesh information based on the level, thereby reducing an error with an original 3D object when compared to an equal transmission rating.

24 Claims, 7 Drawing Sheets

FIG. 5

| Sign | + | + | - | + | - | + | - | - | + |
|------|---|---|---|---|---|---|---|---|---|

1st cluster

| | | | | | | | | | |
|---|---|---|---|---|---|---|---|---|---|
| MSB | 1 | 0 | 1 | 1 | 0 | 0 | 0 | 0 | 0 |
| | 1 | 1 | 0 | 1 | 1 | 0 | 0 | 0 | 0 |
| | 1 | 1 | 0 | 0 | 1 | 1 | 1 | 0 | 0 |
| | 1 | 1 | 1 | 0 | 1 | 0 | 0 | 1 | 0 |
| LSB | 1 | 0 | 0 | 0 | 0 | 0 | 1 | 1 | 1 |

2nd cluster

| 31 | 14 | -18 | 24 | -14 | 4 | -5 | -3 | 1 |

APPARATUS AND METHOD FOR ENCODING THREE-DIMENSIONAL (3D) MESH, AND APPARATUS AND METHOD FOR DECODING 3D MESH

CROSS-REFERENCE TO RELATED APPLICATIONS

This application claims the benefit under 35 U.S.C. §119 (e) of an U.S. Provisional Application No. 61/434,905, filed on Jan. 21, 2011, in the U.S. Patent and Trademark Office, and under 35 U.S.C. §119(a) of a Korean Patent Application No. 10-2011-0050131, filed on May 26, 2011, in the Korean Intellectual Property Office, the entire disclosures of both of which are hereby incorporated by reference.

BACKGROUND

1. Field

One or more example embodiments of the present disclosure relate to an apparatus and method for encoding and decoding a three-dimensional (3D) mesh of a 3D object.

2. Description of the Related Art

Generally, a 3-dimensional (3D) mesh used for restoring a 3D object requires a large storage space, a great amount of calculation, and a wide transmission bandwidth. The 3D mesh is to be compressed through an encoding process in order to effectively transmit, store, and render the 3D object.

When the 3D object is complex, the 3D mesh may also be configured in a complex form, and all information constituting the 3D mesh needs to be transmitted to a decoding apparatus in order to restore the 3D object. This type of scheme is defined as a single bit rate compression scheme, for example, Single Rate Coding.

In the conventional single bit rate compression scheme, position information of vertices, and connectivity information among the vertices are sequentially transmitted, and accordingly there is a problem in that a time delay occurs until all of the position information and connectivity information is transmitted.

SUMMARY

The foregoing and/or other aspects are achieved by providing an apparatus for encoding a three-dimensional (3D) mesh, the apparatus including an information determination unit to determine mesh information including connectivity information among vertices constituting a 3D mesh, and position information of each of the vertices, based on a level, and a bit stream generation unit to generate a bit stream by encoding the mesh information that may be determined based on the level.

The information determination unit may determine mesh information corresponding to a current level, including connectivity information about at least one vertex to be added based on mesh information corresponding to a previous level.

The information determination unit may determine mesh information corresponding to a current level, including mapping information between vertices corresponding to the current level, and vertices corresponding to a previous level.

The bit stream generation unit may include a position information prediction unit to predict position information of vertices corresponding to a current level, based on the position information of vertices corresponding to a previous level, and an encoding unit to encode a prediction error corresponding to a difference between a prediction value and an actual value, in association with the position information of the vertices corresponding to the current level.

The position information prediction unit may predict the position information of the vertices corresponding to the current level, either based on vertices adjacent to a vertex to be added to the current level among the vertices corresponding to the previous level, or based on all of the vertices corresponding to the previous level.

The foregoing and/or other aspects are achieved by providing a method of encoding a 3D mesh, the method including determining mesh information including connectivity information among vertices constituting a 3D mesh, and position information of each of the vertices, based on a level, and generating a bit stream by encoding the mesh information that may be determined based on the level.

The generating of the bit stream may include predicting position information of vertices corresponding to a current level, based on the position information of vertices corresponding to a previous level, and encoding a prediction error corresponding to a difference between a prediction value and an actual value, in association with the position information of the vertices corresponding to the current level.

The foregoing and/or other aspects are achieved by providing an apparatus for decoding a 3D mesh, the apparatus including an information extraction unit to extract, from a bit stream, mesh information including connectivity information among vertices constituting a 3D mesh, and position information of each of the vertices, based on a level, and a 3D mesh restoration unit to restore the 3D mesh using the connectivity information among the vertices and the position information of each of the vertices, constituting the mesh information.

The 3D mesh restoration unit may include a position information prediction unit to predict position information of the vertices by performing an inverse transform on the position information of each of the vertices, and a decoding unit to restore the position information of each of the vertices based on the predicted position information and a prediction error.

The foregoing and/or other aspects are achieved by providing a method of decoding a 3D mesh, the method including extracting, from a bit stream, mesh information including connectivity information among vertices constituting a 3D mesh, and position information of each of the vertices, based on a level, and restoring the 3D mesh using the connectivity information among the vertices and the position information of each of the vertices, constituting the mesh information.

The foregoing and/or other aspects are achieved by providing a non-transitory recording medium in which a bit stream may be stored, the bit stream including a header including mesh number information indicating a number of pieces of mesh information that may be included in compressed data, and data including the mesh information for each level, the mesh information including connectivity information among vertices constituting a 3D mesh and position information of each of the vertices.

The mesh information may further include a header of the position information including position number information indicating a number of pieces of the position information included in the mesh information, and the position information may include a prediction error corresponding to a difference between a prediction value and an actual value, in association with the position information of vertices corresponding to a current level.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 5 illustrates a process of encoding position information of vertices constituting a 3D mesh, in bit plane units according to example embodiments;

DETAILED DESCRIPTION

Figure 1:
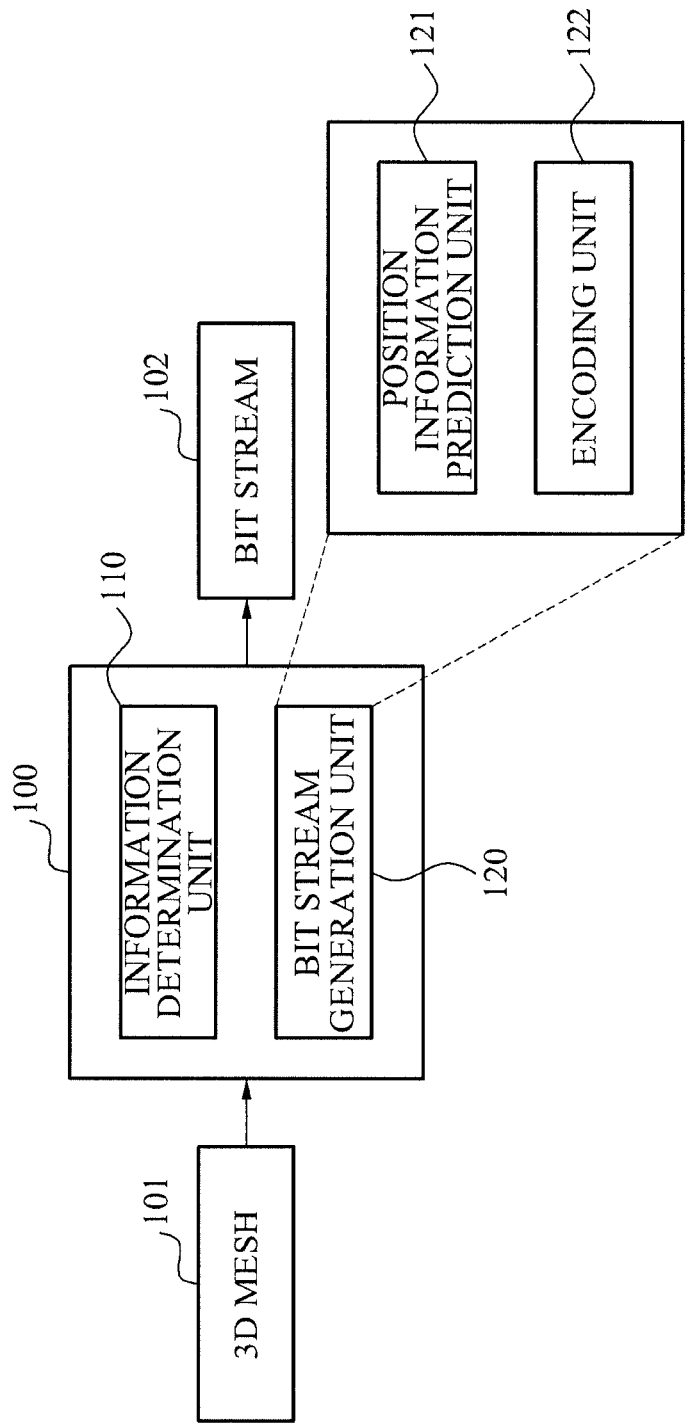
FIG. 1 illustrates a configuration of an apparatus for encoding a three-dimensional (3D) mesh according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of an apparatus 100 for encoding a three-dimensional (3D) mesh 101 according to example embodiments.

Referring to FIG. 1, the 3D mesh encoding apparatus 100, which may be a computer, may include an information determination unit 110, and a bit stream generation unit 120.

The information determination unit 110 may determine mesh information including connectivity information among vertices constituting the 3D mesh 101, and position information of each of the vertices, based on a level. Here, the mesh information may be indicated using Spatial Level of Details (S-LOD), and the position information may be indicated using Quality Level of Details (Q-LOD).

Here, the position information of the vertices may be represented using geometric information which may indicate 3D coordinates for positions of vertices constituting the 3D mesh 101. The connectivity information may indicate types of vertices constituting a face formed by connecting the vertices.

In detail, the information determination unit 110 may classify 3D meshes based on a level, for example, into meshes from a simple form of a mesh to a detailed form of a mesh. The information determination unit 110 may determine mesh information of each of the classified meshes. In this instance, since a number of vertices constituting a 3D mesh corresponding to a lower level may be less than a number of vertices constituting a 3D mesh corresponding to an upper level, the 3D mesh corresponding to the lower level may display a form simpler than the 3D mesh corresponding to the upper level displays. That is, the 3D mesh corresponding to the upper level may display a form more similar to an original 3D object, than the 3D mesh corresponding to the lower level.

As an example, the information determination unit 110 may determine connectivity information and position information related to a base mesh of the 3D mesh as a level 0. Here, the base mesh may correspond to a 3D mesh corresponding to a lowermost level, and may indicate a simplest form in which a face may be formed by connecting vertices. The information determination unit 110 may determine; for each of the other levels, position information and connectivity information about at least one vertex to be added to mesh information corresponding to a current level, based on mesh information corresponding to a previous level. A scheme of determining connectivity information between a vertex to be added and the other vertices may be referred to as a refinement scheme.

Further to this example, it may be assumed that the base mesh corresponding to the level 0 is a triangle including three vertices, and a 3D mesh corresponding to a level 1 is a triangular pyramid including four vertices. In the case of level 0, the information determination unit 110 may determine connectivity information related to the three vertices constituting the triangle, and position information of each of the three vertices. In the case of level 1, the information determination unit 110 may determine connectivity information between a single vertex added to the vertices displayed at the level 0, and the other three vertices, and position information of the four vertices.

As another example, the information determination unit 110 may determine mesh information corresponding to a current level, including mapping information between vertices corresponding to the current level, and vertices corresponding to a previous level, based on a level. For example, when the previous level corresponds to a base mesh, the information determination unit 110 may determine the mapping information indicating whether there is a vertex, among the vertices corresponding to the current level, corresponding to vertices constituting the base mesh.

Further to this example, it may be assumed that the base mesh corresponding to the level 0 is a triangle including three vertices, and a 3D mesh corresponding to a level 1 is a triangular pyramid including four vertices. In the case of level 0, the information determination unit 110 may determine connectivity information related to the three vertices constituting the triangle, and position information of each of the three vertices. In the case of level 1, the information determination unit 110 may determine mapping information about each of vertices corresponding to the level 1 which may correspond to the vertices displayed at the level 0. Also, the information determination unit 110 may determine connectivity information among the four vertices corresponding to the level 1, to be independent from one another. That is, at the level 1, the information determination unit 110 may determine the connectivity information between a vertex 1 and the other three vertices, the connectivity information between a vertex 2 and the other three vertices, the connectivity information between a vertex 3 and the other three vertices, and the connectivity information between a vertex 4 and the other three vertices, to be independent from one another.

The bit stream generation unit 120 may generate the bit stream 102 by encoding the mesh information determined, based on the level. In this instance, the bit stream generation unit 120 may encode the base mesh using Single Rate Coding, and may progressively encode at least one mesh corresponding to other levels, rather than the base mesh, based on the level.

The bit stream generation unit 120 may include a position information prediction unit 121, and an encoding unit 122.

The position information prediction unit 121 may predict the position information of the vertices corresponding to the current level, based on the position information of the vertices corresponding to the previous level.

As an example, the position information prediction unit 121 may predict the position information of the vertices corresponding to the current level, based on some vertices adjacent to a vertex to be added to the current level among the vertices corresponding to the previous level. Although a prediction error may increase, an amount of calculation may be reduced by predicting the position information of the vertices based on the some vertices.

As another example, the position information prediction unit 121 may predict the position information of the vertices corresponding to the current level, based on all of the vertices corresponding to the previous level. Although, an amount of calculation may increase a prediction error may be reduced by predicting the position information of the vertices based on all of the vertices corresponding to the previous level.

The encoding unit 122 may encode the prediction error corresponding to a difference between a prediction value and an actual value, in association with the position information of the vertices corresponding to the current level. The prediction value associated with the position information of the vertices corresponding to the current level may correspond to a value numerically expressing the position information of the vertices corresponding to the current level, predicted by the position information prediction unit 121. The actual value associated with the position information of the vertices corresponding to the current level may correspond to a value numerically expressing coordinates for actual positions of the vertices corresponding to the current level.

In this instance, the encoding unit 122 may sequentially encode the position information corresponding to the current level, in bit plane units. As an example, the encoding unit 1222 may sequentially encode a prediction error associated with the position information corresponding to the current level, in bit plane units. As another example, the encoding unit 122 may sequentially encode an actual value associated with the position information corresponding to the current level, in bit plane units.

For example, position information of each of the vertices constituting the 3D mesh corresponding to the current level may include n bits. The encoding unit 122 may encode the position information of the vertices corresponding to the current level, in sequential order starting from a bit plane corresponding to the Most Significant Bit (MSB) to a bit plane corresponding to the Least Significant Bit (LSB).

The encoding unit 122 may transmit the bit plane corresponding to the MSB first, and then the bit plane corresponding to the LSB, to a 3D mesh decoding apparatus, and accordingly may progressively transmit 3D position information of vertices. In a case of a bit plane close to the MSB, when the position information is encoded in bit plane units, a bit indicating the position information corresponding to the current level may correspond to a value of "0" in a majority of cases, and accordingly compression efficiency may be improved.

Figure 2:
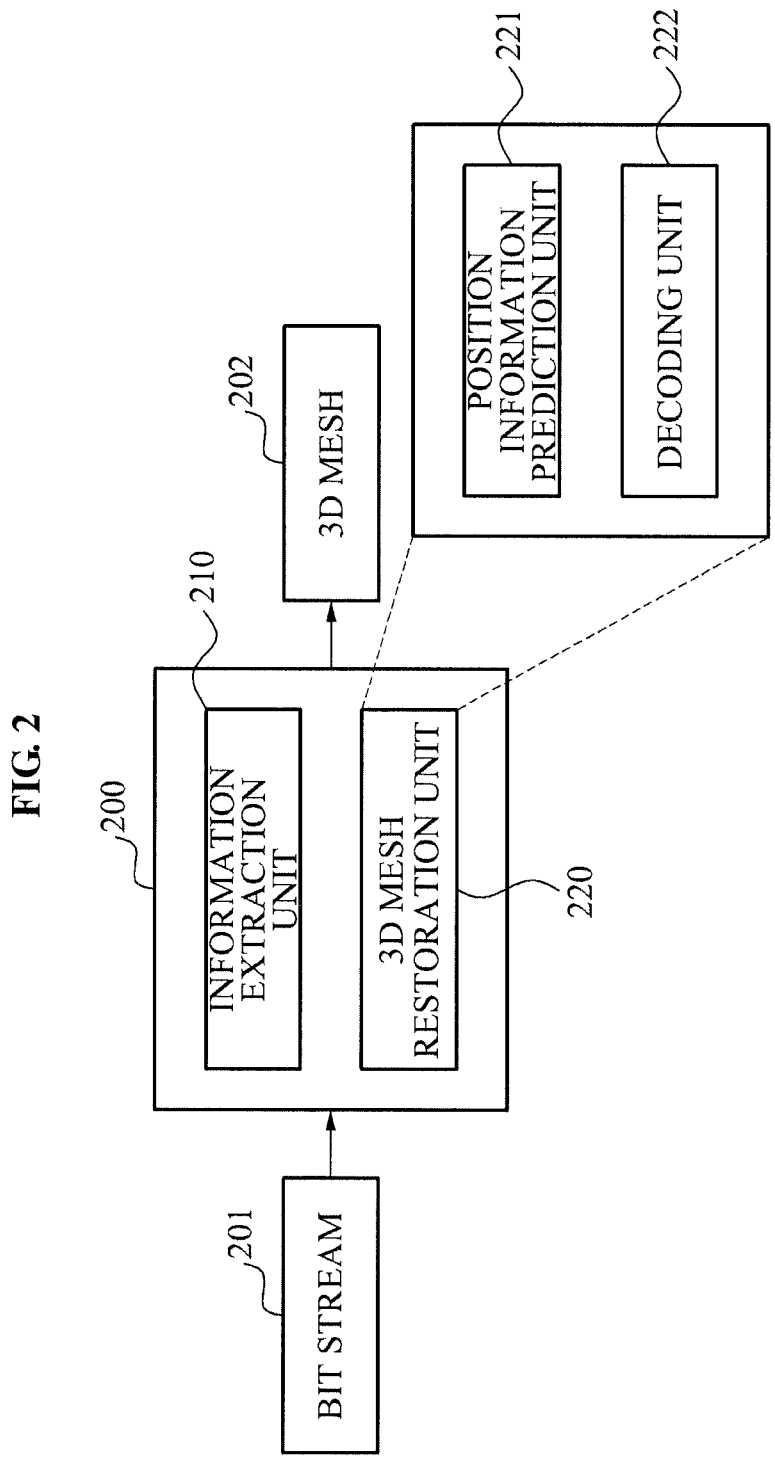
FIG. 2 illustrates a configuration an apparatus for decoding a 3D mesh according to example embodiments.

FIG. 2 illustrates a configuration an apparatus 200 for decoding a 3D mesh 202 according to example embodiments.

Referring to FIG. 2, the 3D mesh decoding apparatus 200, which may be a computer, may include an information extraction unit 210, and a 3D mesh restoration unit 230.

The information extraction unit 210 may receive a bit stream from a 3D mesh encoding apparatus 100 of FIG. 1, and may extract mesh information including connectivity information among vertices constituting the 3D mesh 202, and position information of each of the vertices.

As described with reference to FIG. 1, the mesh information may include connectivity information determined according to a refinement scheme, and may also include connectivity information determined according to a mapping information scheme. That is, the mesh information may include connectivity information about at least one vertex to be added based on mesh information corresponding to a previous level, and may also include mapping information between the vertices corresponding to the current level, and the vertices corresponding to the previous level, and connectivity information among the vertices corresponding to the current level.

The 3D mesh restoration unit 220 may restore the 3D mesh 202 using the connectivity information among the vertices constituting the mesh information extracted based on the level, and the position information of each of the vertices. In this instance, a 3D mesh similar to an original 3D object may be restored by progressively forming a 3D mesh, starting from a 3D mesh in a simple form, that is, a lower level, to a 3D mesh in a complex form, that is, an upper level. The 3D mesh restoration unit 220 may restore the 3D object by applying feature information including color, a perpendicular direction, reflection rate, and the like, to the 3D mesh. The 3D mesh restoration unit 220 may decode with priority the connectivity information indicating a relation among the vertices rather than the position information of each of the vertices. The 3D mesh restoration unit 220 may decode the connectivity information in sequential order starting from the lower lever to the upper level.

That is, the 3D mesh restoration unit 220 may include a position information prediction unit 221, and a decoding unit 222. The position information prediction unit 221 may predict the position information of the vertices by performing an inverse transform on the position information of each of the vertices, included in the mesh information. The decoding unit 222 may restore a prediction error by decoding the bit stream. The decoding unit 222 may restore the position information of each of the vertices, using the predicted position information and the restored prediction error.

As an example, the position information of each of the vertices, included in the mesh information, may correspond to 3D information or position information in a predetermined space, and may have a coordinate value. The position information prediction unit 221 may acquire a 3D coordinate value by performing a Karhunen-Loève (KL) inverse transform on the coordinate value related to the position information of each of the vertices. In this instance, the position information prediction unit 221 may divide the 3D mesh 202 into a plurality of segments, and may acquire a 3D coordinate value for each segment by performing the KL inverse transform on each of the divided segments. That is, the position information prediction unit 221 may predict the position information of each of the vertices, having a 3D coordinate value.

The decoding unit 222 may restore the position information of the at least one vertex to be added to the current level, by summing the 3D coordinate value obtained for each segment, and the prediction error. That is, the decoding unit 222 may restore an actual value related to the position information corresponding to the current level using the prediction error.

In this instance, the decoding unit 222 may restore the position information of each of the vertices corresponding to the current level, using mesh interpolation. When a plurality of vertices are added to the current level based on a previous level, the decoding unit 222 may determine a sequence of adding each vertex to the 3D mesh based on an importance of the vertices to be added. Here, the decoding unit 222 may restore the 3D position coordinates by quantizing the position information of the restored vertices.

In FIG. 2, the 3D mesh decoding apparatus to restore a 3D mesh using a prediction error when the 3D mesh encoding apparatus encodes and transmits the prediction error has been described. In this instance, when the 3D mesh encoding apparatus encodes and transmits an actual value related to position information corresponding to the current level, the 3D mesh decoding apparatus may restore the actual value related to the position information corresponding to the current level, by decoding the position information corresponding to the current level.

Figure 3:
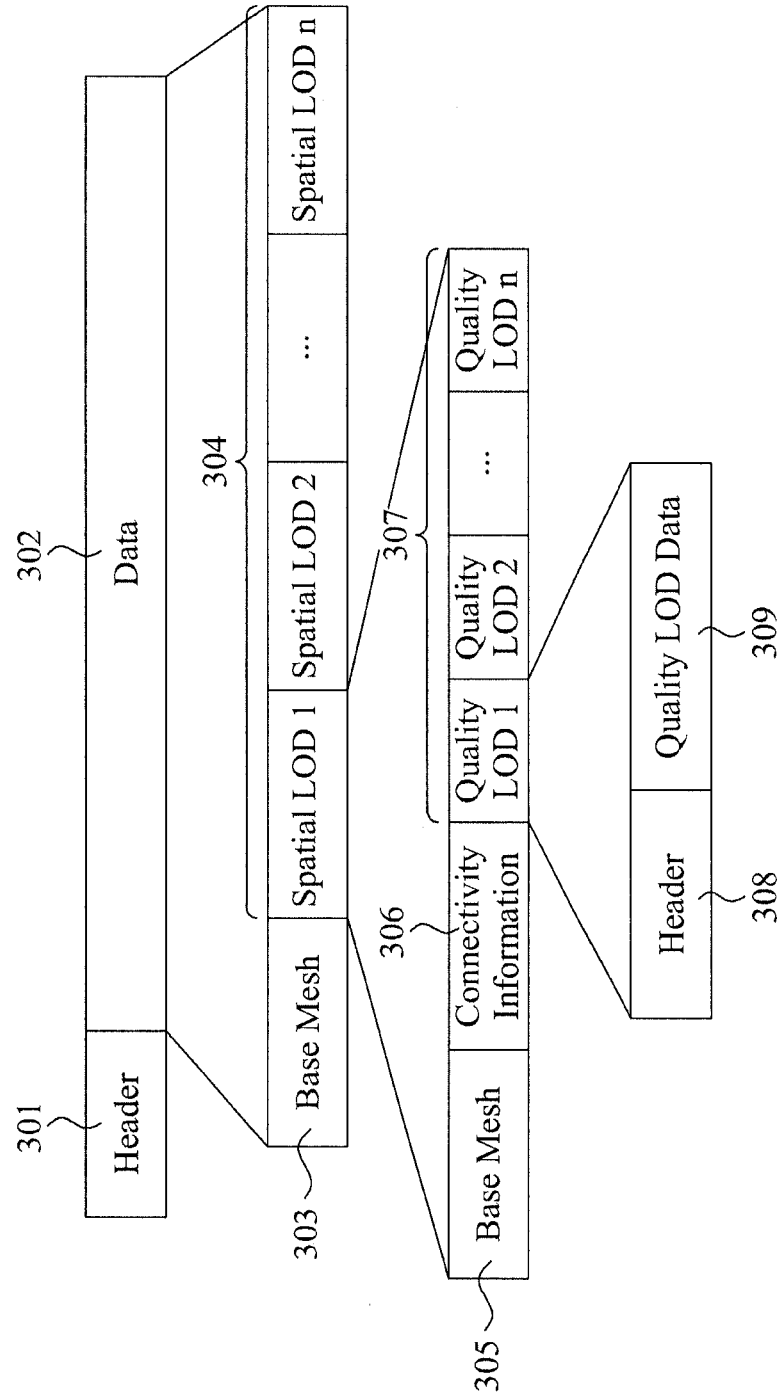
FIG. 3 illustrates a configuration of a bit stream generated by progressively compressing a 3D mesh based on a level according to example embodiments.

FIG. 3 illustrates a configuration of a bit stream generated by progressively compressing a 3D mesh based on a level according to example embodiments.

Referring to FIG. 3, the bit stream may include a header 301 and compressed data 302. The header 301 may include mesh number information indicating a number of pieces of mesh information included in the compressed data 302.

The compressed data 302 may include a plurality of pieces of mesh information determined, based on a level. The mesh information may include a base mesh 303 corresponding to a lowermost level 0, and mesh information corresponding to an upper level, including connectivity information which may progressively have a complex form to be coterminous with original data. The base mesh 303 may correspond to the lowermost level 0, and may be a mesh having a form in which a face may be formed using a minimum number of vertices.

Mesh information 304 may include a header 305 of position information, connectivity information 306, and position information 307 about each of the vertices constituting the 3D mesh. The header 305 of the position information may include position number information indicating a number of pieces of position information included in the mesh information, and information indicating a scheme used for determining connectivity information among the vertices, among a refinement scheme or a mapping information scheme. The connectivity information 306 may include connectivity information indicating connectivity among the vertices corresponding to the current level.

As an example, in the case of a refinement scheme, the connectivity information 306 may include connectivity information between at least one vertex to be added to the current level based on a previous level, and other vertices. For example, it may be assumed that a 3D mesh corresponding to a level 0 may include vertices v1, v2, v3, and v4, and a 3D mesh corresponding to a level 1 may include vertices v1, v2, v3, v4, and v5. The connectivity information corresponding to the level 1 may include connectivity between the vertex v5 and the other vertices v1 through v4. Here, the vertex v5 may be additionally used for restoring the 3D mesh corresponding to the level 1 based on the level 0. That is, the number of vertices indicated based on the level, and the connectivity information may be different from each other.

As another example, in the case of a mapping information scheme, the connectivity information 306 may include connectivity information among all of the vertices corresponding to the current level, and mapping information between vertices corresponding to the current level, which may correspond to vertices corresponding to the previous level. For example, it may be assumed that a 3D mesh corresponding to a level 0 may include vertices v1, v2, v3, and v4, and a 3D mesh corresponding to a level 1 may include vertices v1, v2, v3, v4, and v5. The connectivity information corresponding to the level 1 may independently include connectivity between the vertex v1 and the other vertices v2 through v5, connectivity between the vertex v2 and the other vertices v1, and v3 through v5, connectivity between the vertex v3 and the other vertices v1 and v2, and v4 and v5, connectivity between the vertex v4 and the other vertices v1 through v3, and v5, and connectivity between the vertex v5 and the other vertices v1 through v4, corresponding to the level 1. In this instance, the connectivity information corresponding to the level 1 may further include mapping information between the vertices corresponding to level 1, which may correspond to the vertices corresponding to the level 0.

The position information 307 may include a data header 308, and position data 309. For example, the position data 309 may include a prediction error corresponding to a difference between a prediction value and an actual value, in association with the position information of the vertices corresponding to the current level. The data header 308 may include a quantization bit, a number of pieces of position information of the vertices, and the like. In this instance, the actual value or prediction value of the vertices may be divided into multiple LODs to be stored.

Figure 4:
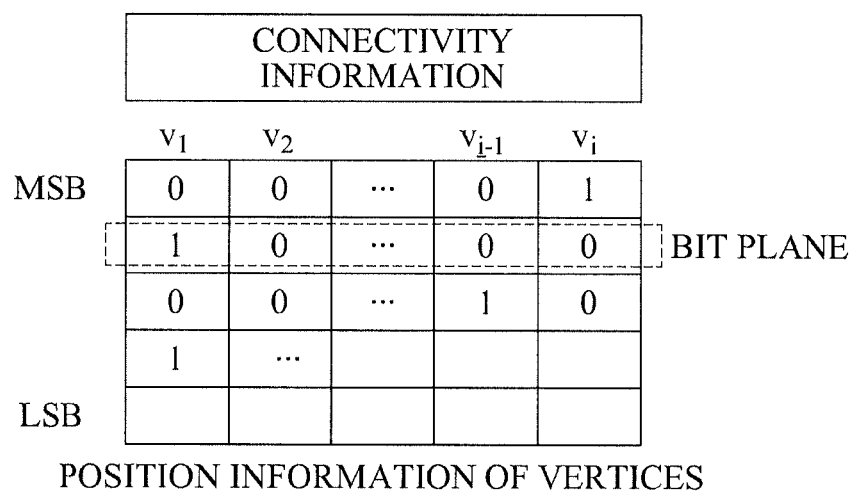
FIG. 4 illustrates position information of each vertex constituting a 3D mesh, in bit plane units according to example embodiments.

FIG. 4 illustrates position information of each vertex constituting a 3D mesh, in bit plane units according to example embodiments.

Referring to FIG. 4, position information of vertices constituting the 3D mesh may be indicated for each bit plane. In this instance, each of the vertices may correspond to $v_1$ through $v_i$, and may be indicated using a bit value that may be classified into the MSB and the LSB. In FIG. 4, the bit plane may include bit values corresponding to each of the vertices constituting the 3D mesh. The 3D mesh encoding apparatus may encode the position information of the vertices corresponding to the current level, in sequential order, starting from a bit plane corresponding to the MSB (Most Significant B.t) to a bit plane corresponding to the LSB (Least Significant B.t).

As aforementioned, the number of vertices indicated based on the level may vary. When a 3D mesh corresponding to a level 0 includes four vertices, the bit plane may include four vertices. When a 3D mesh corresponding to a level 1 includes six vertices, the bit plane may include two vertices. Accordingly, the 3D mesh encoding apparatus may progressively transmit 3D position information of each of the vertices by transmitting the MSB first, and then the LSB. When the position information is close to the MSB, the majority of bits may have a value of "0", and accordingly the 3D mesh encoding apparatus may improve compression efficiency by encoding the position information in sequential order, starting from the MSB to the LSB.

FIG. 5 illustrates a process of encoding position information of vertices constituting a 3D mesh, in bit plane units according to example embodiments.

FIG. 5 shows a bit plane where nine vertices are indicated in 5-bits. The position information of each of the vertices may be indicated using bits, from MSB to LSB, and may be encoded based on a raster scan order. In this instance, an important portion of the position information of the vertices may be determined by the MSB. Accordingly, importance for each bit plane in relation to the position information of the vertices of 3D mesh may be higher when the position information is closer to the MSB, rather than the LSB.

Referring to FIG. 5, the 3D encoding apparatus may classify bit planes using clusters, with a position where the MSB may initially correspond to 1 as the center, in order to increase encoding efficiency of the position information of the vertices. A probability that all of bits in a first cluster, excluding a boundary with a second cluster, may have 0 bits may be high, and accordingly the encoding efficiency may be improved.

The bits in the first cluster may have a high probability of having 0 bits when close to the MSB, and accordingly the bits in the first cluster may be classified into m classes based on the bit plane. Accordingly, the bits in the first cluster may be encoded based on the classes. When the bit plane is encoded based on the cluster using the aforementioned characteristic, the bits in the first cluster may be minimized and encoded.

Figure 6:
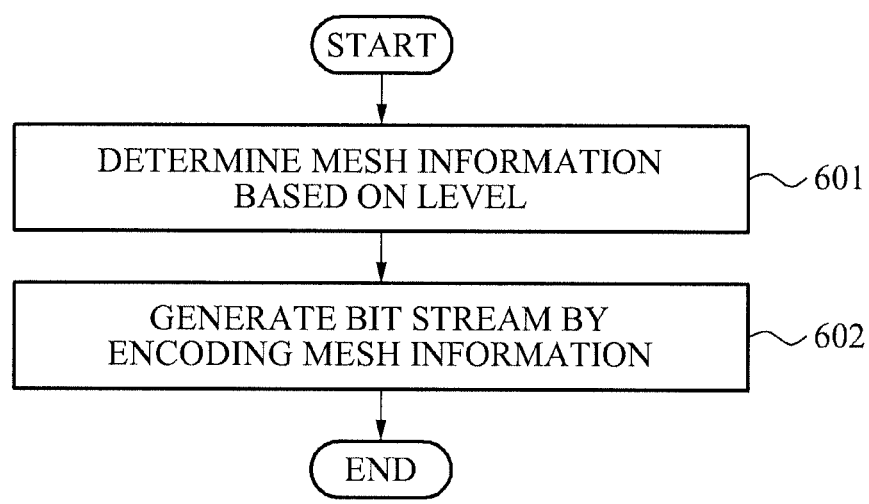
FIG. 6 illustrates a method of progressively encoding mesh information in the 3D mesh encoding apparatus of FIG. 1 according to example embodiments.

FIG. 6 illustrates a method of progressively encoding mesh information in the 3D mesh encoding apparatus 100 of FIG. 1 according to example embodiments.

Referring to FIG. 6, in operation 601, the 3D mesh encoding apparatus 100 may determine mesh information about a 3D mesh corresponding to a 3D object, based on a level. The mesh information may include connectivity information among vertices constituting the 3D mesh, and position information of each of the vertices. In this instance, the 3D mesh encoding apparatus 100 may determine the mesh information using a refinement scheme or a mapping information scheme. The information indicating the scheme used for determining the mesh information may be included in a header of the mesh information.

As an example, in the case of a refinement scheme, the 3D mesh encoding apparatus 100 may determine mesh information corresponding to a current level, including connectivity information about at least one vertex to be added based on mesh information corresponding to a previous level.

As another example, in the case of a mapping information scheme, the 3D mesh encoding apparatus 100 may determine the mesh information corresponding to the current level, including mapping information between vertices corresponding to the current level, and vertices corresponding to the previous level. The mapping information may refer to information indicating an association among vertices located in a position corresponding to the vertices corresponding to the previous level, among the vertices corresponding to the current level.

In this instance, the 3D mesh encoding apparatus 100 may determine the mesh information independently and include connectivity information among the vertices corresponding to the current level, for each vertex.

In operation 602, the 3D mesh encoding apparatus 100 may generate a bit stream by encoding the mesh information.

In this instance, the 3D mesh encoding apparatus 100 may encode mesh information about a base mesh corresponding to a level 0 using Single Rate Coding, and may progressively encode mesh information corresponding to the other levels, rather than the level 0, in bit plane units.

That is, the 3D mesh encoding apparatus 100 may predict the position information of the vertices corresponding to the current level, using the position information of the vertices corresponding to the previous level. The 3D mesh encoding apparatus 100 may calculate a prediction error corresponding to a difference between a prediction value and an actual value, in association with the position information of the vertices corresponding to the current level. The 3D mesh encoding apparatus 100 may transmit the prediction error to the 3D mesh decoding apparatus 200, by progressively encoding the prediction error in bit plane units. For example, the 3D mesh encoding apparatus 100 may encode the position information of the vertices corresponding to the current level, in sequential order starting from a bit plane corresponding to the MSB to a bit plane corresponding to the LSB.

Figure 7:
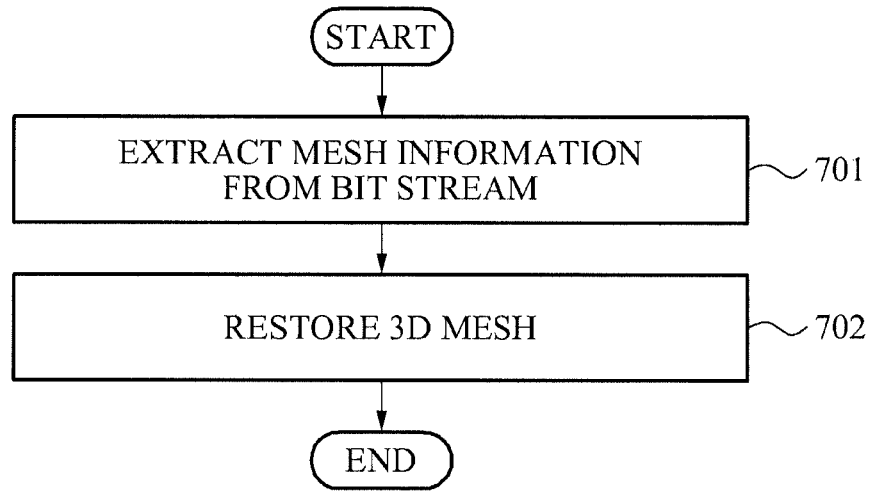
FIG. 7 illustrates a method of restoring a 3D mesh in the 3D mesh decoding apparatus of FIG. 2 according to example embodiments.

FIG. 7 illustrates a method of restoring a 3D mesh in the 3D mesh decoding apparatus 200 of FIG. 2 according to example embodiments.

Referring to FIG. 7, in operation 701, the 3D mesh decoding apparatus 200 may extract, from a bit stream, mesh information determined based on a level. The mesh information may include connectivity information among vertices constituting the 3D mesh, and position information of each of the vertices. In this instance, a header of the mesh information may include information indicating whether a scheme used for determining the mesh information based on the level corresponding to a refinement scheme or a mapping information scheme. When the mesh information is determined using the mapping information scheme, the mesh information may further include mapping information.

In operation 702, the 3D mesh decoding apparatus 200 may restore the 3D mesh using the connectivity information among the vertices constituting the mesh information, and the position information of each of the vertices.

As an example, the 3D mesh decoding apparatus 200 may predict the position information of the vertices by performing an inverse transform on the position information of each of the vertices. In this instance, the 3D mesh decoding apparatus may predict the position information of each of the vertices corresponding to a current level, by performing the Karhunen-Loève (KL) inverse transform bn the position information of each of the vertices corresponding to a previous level. The 3D mesh decoding apparatus 200 may restore the 3D mesh by summing the predicted position information and a restored prediction error. The 3D mesh decoding apparatus 200 may restore a 3D object corresponding to the 3D mesh.

According to example embodiments, an original 3D object may be restored using little information by applying a progressive encoding scheme that may simplify a 3D mesh based on a level, and may encode the 3D mesh in order, starting from a simple mesh corresponding to a low level to a complex mesh corresponding to a high level.

Also, a data compression rate may be improved by progressively encoding position information and connectivity information about vertices of the 3D mesh.

The methods according to the above-described embodiments may be recorded in non-transitory, computer-readable media including program instructions to implement various operations embodied or executed by a computer. The media may also include, alone or in combination with the program instructions, data files, data structures, and the like. Examples of non-transitory, computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the display apparatuses described herein.

Although embodiments have been shown and described, it would be appreciated by those skilled in the art that changes may be Made in these embodiments without departing from the principles and spirit of the disclosure, the scope of which is defined by the claims and their equivalents.

What is claimed is:

1. An apparatus for encoding a three-dimensional (3D) mesh, the apparatus comprising:

an information determination unit to determine mesh information comprising connectivity information among vertices constituting a 3D mesh, and position information of each of the vertices, based on a level; and
a bit stream generation unit to generate a bit stream by encoding the mesh information that is determined based on the level,
wherein the mesh information comprises a prediction error corresponding to a difference between a prediction value and an actual value, in association with the position information of vertices corresponding to a current level.

2. The apparatus of claim 1, wherein the information determination unit determines mesh information corresponding to a current level, comprising connectivity information about at least one vertex to be added based on mesh information corresponding to a previous level.

3. The apparatus of claim 1, wherein the information determination unit determines mesh information corresponding to a current level, comprising mapping information between vertices corresponding to the current level, and vertices corresponding to a previous level.

4. The apparatus of claim 1,
wherein the bit stream generation unit comprises:
a position information prediction unit to predict position information of vertices corresponding to a current level, based on the position information of vertices corresponding to a previous level; and
an encoding unit to encode a prediction error corresponding to a difference between a prediction value and an actual value, in association with the position information of the vertices corresponding to the current level.

5. The apparatus of claim 4, wherein the position information prediction unit predicts the position information of the vertices corresponding to the current level, either based on vertices adjacent to a vertex to be added to the current level among the vertices corresponding to the previous level, or based on all of the vertices corresponding to the previous level.

6. The apparatus of claim 4, wherein the encoding unit sequentially encodes the position information of the vertices corresponding to the current level, in bit plane units.

7. The apparatus of claim 6, wherein the encoding unit encodes the position information of the vertices corresponding to the current level, in sequential order starting from a bit plane corresponding to the Most Significant Bit (MSB) to a bit plane corresponding to the Least Significant Bit (LSB).

8. A method of encoding a three-dimensional (3D) mesh, the method comprising:
determining mesh information comprising connectivity information among vertices constituting a 3D mesh, and position information of each of the vertices, based on a level; and
generating a bit stream by encoding the mesh information that is determined based on the level,
wherein the mesh information comprises a prediction error corresponding to a difference between a prediction value and an actual value, in association with the position information of vertices corresponding to a current level.

9. The method of claim 8, wherein the determining comprises determining mesh information corresponding to a current level, comprising connectivity information about at least one vertex to be added based on mesh information corresponding to a previous level.

10. The method of claim 8, wherein the determining comprises determining mesh information corresponding to a current level, comprising mapping information between vertices corresponding to the current level and vertices corresponding to a previous level.

11. The method of claim 8, wherein the generating comprises:
predicting position information of vertices corresponding to a current level, based on the position information of vertices corresponding to a previous level; and
encoding a prediction error corresponding to a difference between a prediction value and an actual value, in association with the position information of the vertices corresponding to the current level.

12. The method of claim 11, wherein the predicting comprises predicting the position information of the vertices corresponding to the current level, either based on vertices adjacent to a vertex to be added to the current level, among the vertices corresponding to the previous level, or based on all of the vertices corresponding to the previous level.

13. The method of claim 11, wherein the encoding comprises sequentially encoding the position information of the vertices corresponding to the current level, in bit plane units.

14. The method of claim 13, wherein the encoding comprises encoding the position information of the vertices corresponding to the current level, in sequential order starting from a bit plane corresponding to the Most Significant Bit (MSB) to a bit plane corresponding to the Least Significant Bit (LSB).

15. A method as recited in claim 8, wherein the encoding progresses from a simple mesh to a complex mesh.

16. An apparatus for decoding a three-dimensional (3D) mesh, the apparatus comprising:
an information extraction unit to extract, from a bit stream, mesh information comprising connectivity information among vertices constituting a 3D mesh, and position information of each of the vertices, based on a level; and
a 3D mesh restoration unit to restore the 3D mesh using the connectivity information among the vertices and the position information of each of the vertices, constituting the mesh information,
wherein the position information of each of the vertices is restored using predicted position information of the vertices and a prediction error restored from the bit stream.

17. The apparatus of claim 16, wherein the mesh information comprises connectivity information about at least one vertex to be added based on mesh information corresponding to a previous level.

18. The apparatus of claim 16, wherein the mesh information comprises mapping information between vertices corresponding to a current level and vertices corresponding to a previous level, and connectivity information among the vertices corresponding to the current level.

19. The apparatus of claim 16, wherein the 3D mesh restoration unit comprises:
a position information prediction unit to predict position information of the vertices by performing an inverse transform on the position information of each of the vertices; and
a decoding unit to restore the position information of each of the vertices based on the predicted position information and a prediction error.

20. The apparatus of claim 19, wherein the position information prediction unit segments the 3D mesh into a plurality of areas, and predicts the position information of the vertices by performing the Karhunen-Loève inverse transform for each of the segmented areas.

21. A method of decoding a three-dimensional (3D) mesh, the method comprising:

extracting, from a bit stream, mesh information comprising connectivity information among vertices constituting a 3D mesh, and position information of each of the vertices, based on a level; and restoring the 3D mesh using the connectivity information among the vertices and the position information of each of the vertices, constituting the mesh information, wherein the position information of each of the vertices is restored using predicted position information of the vertices and a prediction error restored from the bit stream.

22. A non-transitory computer readable recording medium in which a bit stream is stored, wherein the bit stream comprises:

a header comprising mesh number information indicating a number of pieces of mesh information that is included in compressed data; and data comprising the mesh information for each level, the mesh information comprising connectivity information among vertices constituting a three-dimensional (3D) mesh and position information of each of the vertices, wherein the position information comprises a prediction error corresponding to a difference between a prediction value and an actual value, in association with the position information of vertices corresponding to a current level.

23. The medium of claim 22, wherein the mesh information further comprises a header of the position information comprising position number information indicating a number of pieces of the position information included in the mesh information.

24. A method of encoding a three-dimensional (3D) mesh, the method comprising:

identifying mesh information comprising connectivity information for vertices of the mesh and position information of each of the vertices responsive to mesh complexity level progressing from a simple mesh to a complex mesh; and generating a bit stream by encoding the mesh information identified responsive to the mesh complexity level, wherein the mesh information comprises a prediction error corresponding to a difference between a prediction value and an actual value, in association with the position information of vertices corresponding to a current level.

* * * * *